(12) United States Patent
Nodera et al.

(10) Patent No.: US 6,462,167 B1
(45) Date of Patent: Oct. 8, 2002

(54) POLYCARBONATE RESIN COMPOSITION FOR GAS ASSIST INJECTION MOLDING, PROCESS FOR PRODUCING BLOW-MOLDED ARTICLE, AND BLOW-MOLDED ARTICLE

(75) Inventors: Akio Nodera, Ichihara (JP); Naoki Mitsuta, Ichihara (JP); Kouichi Hara, Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/831,917

(22) PCT Filed: Nov. 24, 1999

(86) PCT No.: PCT/JP99/06536

§ 371 (c)(1),
(2), (4) Date: May 25, 2001

(87) PCT Pub. No.: WO00/32692

PCT Pub. Date: Jun. 8, 2000

(30) Foreign Application Priority Data

Nov. 27, 1998 (JP) ............................................. 10-337347

(51) Int. Cl.⁷ .............................................. C08G 64/00
(52) U.S. Cl. ...................................... 528/196; 528/198
(58) Field of Search .................................. 528/196, 198

(56) References Cited

U.S. PATENT DOCUMENTS 5,656,234 A    8/1997    Kaneishi et al.

FOREIGN PATENT DOCUMENTS

| JP | 5-301257 | 11/1993 |
| JP | 5-301262 | 11/1993 |
| JP | 7-24863 | 1/1995 |
| JP | 7-258532 | 10/1995 |
| JP | 9-3142 | 1/1997 |
| JP | 9-87466 | 3/1997 |
| JP | 10-250496 | 9/1998 |
| JP | 10-338806 | 12/1998 |

*Primary Examiner*—Terressa M. Boykin
(74) *Attorney, Agent, or Firm*—Oblon, Spivak, McClelland, Maier & Neustadt, P.C.

(57) ABSTRACT

Disclosed is a method for producing blow moldings of essentially polycarbonate resin. The blow moldings may have a relatively high percentage of hollowness, and may have a ribbed structure, and their wall thickness is uniform. Forming ribs in the blow moldings is easy. Also disclosed is a polycarbonate resin composition for the method. The polycarbonate resin composition is for gas assist injection molding and comprises (A) from 30 to 100% by weight of a polycarbonate resin and (B) from 0 to 70% by weight of a styrenic resin. The melt viscosity ratio, $\eta H/\eta L$, of the melt viscosity of the resin composition, $\eta H$ (Pa·sec), measured at a shear rate of 10 (sec$^{-1}$) at the optimum molding temperature to the melt viscosity thereof, $\eta L$ (Pa·sec), at a shear rate of 1000 (sec$^{-1}$), is at least 5. When the polycarbonate resin composition is molded into blow moldings in a mode of gas assist injection molding, the mold cavity volume is expanded while the pressure gas is still in the resin melt in the mold cavity. Provided are the blow moldings of the polycarbonate resins produced in the gas assist injection molding method.

7 Claims, No Drawings

POLYCARBONATE RESIN COMPOSITION FOR GAS ASSIST INJECTION MOLDING, PROCESS FOR PRODUCING BLOW-MOLDED ARTICLE, AND BLOW-MOLDED ARTICLE

TECHNICAL FIELD

The present invention relates to a method for producing blow moldings through gas assist resin injection, to blow moldings, and to a polycarbonate resin composition for gas assist injection molding suitable to the production method. More precisely, the invention relates to a method for producing blow moldings having the advantages of good moldability and wall thickness uniformity even when the percentage of hollowness of the moldings is relatively high, in particular to a method for producing ribbed blow moldings.

BACKGROUND ART

As having the advantages of impact resistance, heat resistance, good electric properties and dimensional stability, polycarbonate resins have many applications in various fields of, for example, OA (office automation) appliances, information and communication appliances, electric and electronic appliances for industrial use and household use, automobile parts and building materials. However, there are some problems with polycarbonate resins in that they require high molding and working temperatures and their melt flowability is low. On the other hand, moldings for housings and parts for OA appliances and information and communication appliances such as typically duplicators and facsimiles and for other electric and electronic appliances are now required to have a complicated shape with local projections or depressions, for example, having ribs or bosses therewith, and to be lightweight and thin-walled from the viewpoint of resources saving. Therefore, desired are polycarbonate resins and polycarbonate resin compositions having increased melt flowability, or that is, having increased injection moldability.

Compositions of polycarbonate resins, to which are added styrenic resins such as acrylonitrile-butadiene-styrene resins (ABS resins), rubber-modified polystyrene resins (HIPS), acrylonitrile-styrene resins (AS resins) or the like for improving the melt flowability of the compositions, are known as polymer alloys, and have many applications in the field of moldings as having good heat resistance and impact resistance. Polycarbonate resins are self-extinguishable. However, their polymer alloys for OA appliances, information and communication appliances and other electric and electronic appliances are required to have higher flame retardancy of not lower than a predetermined level so as to ensure and increase the safety of their moldings for those applications.

To meet the requirements, various polycarbonate resin compositions have heretofore been proposed. Concretely, Japanese Patent Laid-Open No. 55145/1986 discloses a thermoplastic resin composition comprising (A) an aromatic polycarbonate resin, (B) an ABS resin, (C) an AS resin, (D) a halogen compound, (E) a phosphate, and (F) a polytetrafluoroethylene component. Japanese Patent Laid-Open No. 32154/1990 discloses a molding polycarbonate composition with high flame retardancy and high impact resistance, which comprises (A) an aromatic polycarbonate resin, (B) an ABS resin, (C) an As resin, (D) a phosphate, and (E) a polytetrafluoroethylene component.

A method of injection molding is excellent in that its productivity is high and its design latitude is broad. Therefore, the above-mentioned polycarbonate resin compositions comprising, as the essential ingredient, a polycarbonate resin are formed into various moldings according to such an injection molding method. However, some problems are pointed out with the injection molding method in that the moldings produced are often burred owing to high injection-molding pressure applied thereto and the burrs often damage the molds used. Another problem with it is that the moldings produced are often warped owing to the residual strain thereof caused by high dwell pressure in cooling them. Still another problem is that the moldings, especially thick-wall parts thereof are often shrunk to have shrink marks. Because of these problems, use of injection moldings in the field in which their outward appearance is considered important is restricted.

On the other hand, the social desire for saving resin and for lightweight moldings is much increasing for saving natural resources. For lightweight moldings, their walls may be thinned, which, however, is naturally limitative in view of the melt flowability of resin for them, the applicability of the method to large-size moldings, and the mechanical strength and the toughness of such thin-walled moldings. Also for lightweight moldings, they may be foamed. However, use of foamed moldings is limited in view of their mechanical strength and appearance. Still another method for lightweight moldings is blow-molding to produce hollow articles, a-type of blow moldings.

The blow-molding method comprises blowing a molten parison with air being applied inside it to thereby transfer the mold profile onto the thus-blown parison. The method is characterized in that the percentage of hollowness of the moldings produced therein can be relatively freely varied. However, this is problematic in that the parison being blown is often unstable, the wall thickness of the moldings produced is often uneven and the mechanical strength and the toughness of the moldings could not be increased with ease. For increasing the mechanical strength and the toughness of the moldings, one modification of blow molding has been proposed, which comprises forming ribs inside the blow moldings. In this modification, the ribs are formed inside the blow moldings, depending on the profile of the mold used. Accordingly, the moldings produced shall have recesses formed on their surface, and are therefore problematic in that they could not be used in some applications.

For still another modification of producing blow moldings, a gas assist injection molding method is much used in the field of various moldings. This method comprises injecting a resin melt into an injection mold, followed by blowing the resin melt with a pressure gas forcedly applied thereinto to thereby form a hollow inside the thus-blown resin melt. The gas assist injection molding method is characterized in that the pressure for resin injection into the mold may be relatively low, that the percentage of hollowness of the blow moldings to be produced can be controlled in any desired manner, and that the hollow can be selectively formed in the thick-wall part of the moldings. The other characteristics of the gas assist injection molding method are that the blown resin melt is not shrunk while it is solidified to be a molding (this is because, in the gas assist injection molding method, the pressure in the mold is well kept as it is owing to the pressure gas therein while the blown resin melt is cooled), and that the residual strain of the moldings is low and the moldings are not warped (this is because the molding pressure is relatively low). Because of such excellent characteristics, the method produces good blow moldings.

In the gas assist injection molding method, used are polypropylene resins, rubber-modified polystyrene resins, ABS resins, etc. In addition, polycarbonate resin moldings producing in a mode of such gas assist blow molding have been proposed. For example, Japanese Patent Laid-Open No. 70852/1997 discloses polycarbonate resin blow moldings, which are produced in a mode of blow injection molding of a polycarbonate resin and for which the polycarbonate resin comprises, as the essential ingredient, a chloride ion-free polycarbonate having an alkali metal and/or alkaline earth metal content of from 1 to 800 ppb, an aromatic monohydroxy compound content of from 1 to 200 ppm, a content of the oligomer component having a molecular weight of at most 1000 and the residual monomer of from $T_1$ to $T_2\%$ by weight ($T_1=1,130,000\times$(weight-average molecular weight of the polycarbonate)$^{-1.60}$; $T_2=1,520,000\times$(weight-average molecular weight of the polycarbonate)$^{-1.44}$), and a terminal hydroxyl content of from 1 to 30 mol %. They say that the blow injection molding method which they employed is to form a hollow inside the blow molding owing to the pressure gas introduced into the melt parison, and that their method has good moldability and gives good blow moldings having uniform wall thickness. However, it is not always easy to control the specific polycarbonate for their method.

Japanese Patent Laid-Open No. 250496/1998 discloses gas assist blow moldings of a resin composition that comprises (A) from 40 to 60% by weight of an aromatic polycarbonate, (B) from 40 to 60% by weight of a thermoplastic graft copolymer of a dienic rubber component grafted with a vinyl cyanide compound and an aromatic vinyl compound, and (C) from 1 to 8% by weight of a thermoplastic graft copolymer of a dienic rubber component grafted with a methacrylate and/or an acrylate and with an aromatic vinyl compound. The moldings disclosed have a percentage of hollowness of from 1 to 30%. They say that the gas assist blow moldings have a good appearance and are favorable to interior and exterior parts of automobiles, and say that the moldings are produced by injecting a molten resin composition into a mold cavity followed by introducing a pressure gas into the resin melt.

In their Examples that demonstrate the gas assist injection molding of the polycarbonate resin composition, obtained are blow moldings having a percentage of hollowness of from 8 to 40%, and they say that the moldings produced have uniform wall thickness. However, the moldings concretely disclosed in these patent publications are all small-sized ones. Through our studies, we, the present inventors have found that tabular moldings of ordinary polycarbonate resin having a relatively large size of tens cm or more could not have a uniform wall thickness, as their wall thickness locally varies, and their mechanical strength is not on a commercial level. We have further found that the problem is serious with lightweight moldings having a percentage of hollowness of larger than 40%. In addition, the patent publications do neither disclose nor suggest the melt viscosity characteristics of resin.

For increasing the mechanical strength and the toughness of tabular blow moldings, the mold cavity volume may be expanded with a pressure gas being continuously introduced thereinto so as to increase the percentage of hollowness of the blow moldings especially those having reinforcing ribs between the opposite resin walls. In the method, however, it is difficult to accurately form accurate the ribs. We have found that the method is therefore problematic in that blow moldings having good mechanical strength and toughness could not be produced with ease. Recently, resin compositions of good moldability that comprise a polycarbonate resin and a styrenic resin, and flame-retardant resin compositions containing a phosphate compound have been much used for ordinary injection molding materials. However, solving the problem of wall thickness unevenness with the moldings of such resin compositions is still difficult.

Given that situation, the present invention is to produce blow moldings of polycarbonate resin for OA appliances, information and communication appliances, other electric and electronic appliances for industrial use and household use, automobile parts and building materials, in a method of gas assist injection molding in which even such blow moldings having a relatively high percentage of hollowness, especially those having a ribbed structure can have a uniform wall thickness and in which the ribs can be easily formed in the moldings produced. Specifically, the object of the invention is to provide a polycarbonate resin composition for the gas assist injection molding method, and to provide the blow moldings produced in the method.

DISCLOSURE OF THE INVENTION

To attain the object of the invention, we, the present inventors have assiduously studied a gas assist injection molding method for polycarbonate resin compositions, especially those of good flowability that comprise a polycarbonate resin and a styrenic resin, and also for flame-retardant polycarbonate resin compositions that contain a flame retardant such as a phosphate compound. As a result, we have found that, when a polycarbonate resin or a polycarbonate resin composition capable of exhibiting specific melt viscosity characteristics at its temperature at which it is molded in a mode of gas assist injection molding, is selectively used, then the above-mentioned problems can be solved. On the basis of this finding, we have completed the present invention.

Specifically, the invention provides the following:

(1) A polycarbonate resin composition for gas assist injection molding, which comprises (A) from 30 to 100% by weight of a polycarbonate resin and (B) from 0 to 70% by weight of a styrenic resin, and of which the melt viscosity ratio, $\eta H/\eta L$, of the melt viscosity thereof, $\eta H$ (Pa·sec), measured at a shear rate of 10 (sec$^{-1}$) at the optimum molding temperature to the melt viscosity thereof, $\eta L$ (Pa·sec), at a shear rate of 1000 (sec$^{-1}$), is at least 5.

(2) The polycarbonate resin composition for gas assist injection molding of above (1), wherein the component (A) contains a branched polycarbonate resin.

(3) The polycarbonate resin composition for gas assist injection molding of above (1) or (2), which contains a tabular filler and/or a short fiber filler.

(4) The polycarbonate resin composition for gas assist injection molding of any of above (1) to (3), for which the mold cavity volume is expanded with the pressure gas being present in the cavity along with the resin composition therein.

(5) The polycarbonate resin composition for gas assist injection molding of any of above (1) to (4), which contains a flame retardant.

(6) A method for producing blow moldings, which comprises injecting a melt of the polycarbonate resin composition of any of above (1) to (5) into a mold cavity not expanded, introducing a pressure gas into the resin melt being or having been injected into the mold cavity, and expanding the mold cavity volume with the pressure gas being still in the resin melt in the mold cavity.

(7) A blow molding produced in the method of above (6).

(8) A blow molding produced in the method of above (6), which has reinforcing ribs formed therein.

BEST MODES OF CARRYING OUT THE INVENTION

The invention is described in detail hereinunder. The invention includes a first aspect directed to a polycarbonate resin composition having a specific melt viscosity profile for gas assist injection molding; a second aspect directed to a specific gas assist injection molding method for producing blow moldings from the polycarbonate resin composition; and a third aspect directed to the blow moldings produced in the method.

The first aspect of the invention is to provide a polycarbonate resin composition for gas assist injection molding, which comprises (A) from 30 to 100% by weight of a polycarbonate resin and (B) from 0 to 70% by weight of a styrenic resin, and of which the melt viscosity ratio, $\eta H/\eta L$, of the melt viscosity thereof, $\eta H$ (Pa·sec), measured at a shear rate of 10 ($sec^{-1}$) at the optimum molding temperature to the melt viscosity thereof, $\eta L$ (Pa·sec), at a shear rate of 1000 ($sec^{-1}$), is at least 5.

The optimum molding temperature referred to herein is meant to indicate the resin temperature at which the resin is actually molded through gas assist injection. The optimum molding temperature of the polycarbonate resin composition for gas assist injection molding of the invention varies, depending on the molecular weight and the molecular structure of the essential ingredient, polycarbonate resin of the resin composition and on the additives which the resin composition contains, and therefore could not be defined indiscriminately. Concretely, however, it may be the temperature at which the melt viscosity of the resin composition at a shear rate of 1000 ($sec^{-1}$) may fall between 200 and 800 (Pa·sec). The condition for measurement of the melt viscosity of the resin composition will be described hereinunder.

The polycarbonate resin and its composition having the specific melt viscosity profile can be obtained by using a polycarbonate resin having a controlled branched structure, or by adding a tabular filler such as talc or a short fiber filler to a polycarbonate resin, or by adding a melt viscosity-improving resin except polycarbonate resin to a polycarbonate resin, or by a combination of any of these. The melt viscosity profile of the polycarbonate resin or the resin composition is the characteristic of the final molding material to be injected into a mold for gas assist injection molding, and the final molding material contains the necessary additives added to the resin or the resin composition.

The polycarbonate resin (PC) of the component (A) for use in the invention is not specifically defined, including various types of polycarbonate resins having different structures and different molecular weights. In general, however, used for the component (A) is an aromatic polycarbonate produced through reaction of a diphenol and a carbonate precursor. The aromatic polycarbonate may be produced by reacting a diphenol and a carbonate precursor in a solution method or a melt method. In the solution method, a diphenol may be reacted with phosgene; and in the melt method, a diphenol may be reacted with an ester such as diphenyl carbonate through transesterification.

The diphenol includes various types of compounds. Concretely, it includes, for example, 2,2-bis(4-hydroxyphenyl)propane [that is, bisphenol A], bis(4-hydroxyphenyl)methane, 1,1-bis(4-hydroxyphenyl)ethane, 2,2-bis(4-hydroxy-3,5-dimethylphenyl)propane, 4,4'-dihydroxydiphenyl, bis(4-hydroxyphenyl)cycloalkanes, bis(4-hydroxyphenyl)oxide, bis(4-hydroxyphenyl)sulfide, bis(4-hydroxyphenyl)sulfone, bis(4-hydroxyphenyl)sulfoxide, bis(4-hydroxyphenyl ether, bis(4-hydroxyphenyl)ketone, etc., and their halogen-substituted derivatives. Preferred for the diphenol are bis(hydroxyphenyl)alkanes; and more preferred is bisphenol A. In addition to the above, the diphenol further includes hydroquinone, resorcinol, catechol, etc. One or more of these diphenols may be used herein either singly or as combined.

The polycarbonate precursor includes carbonyl halides, carbonyl esters, haloformates, etc. Concretely, it includes, for example, phosgene, dihaloformates of diphenols, diphenyl carbonate, dimethyl carbonate, diethyl carbonate, etc.

In case where a polycarbonate resin is used substantially singly in the invention, it is desirable that the resin has a branched structure. The branched structure may be introduced into a polycarbonate resin by treating it with a branching agent of a compound having at least three functional groups. The branching agent includes, for example, 1,1,1-tris(4-hydroxyphenyl)ethane, $\alpha,\alpha',\alpha''$-tris(4-hydroxyphenyl)-1,3,5-triisopropylbenzene, phloroglucinol, trimellitic acid, isatin-bis(o-cresol), $\beta$-resorcinol, etc. The amount of the branching agent to be reacted with a polycarbonate resin preferably falls between 0.2 and 2.0 mol % or so of the total amount of the diphenol residue in the resin. Naturally, a polycarbonate resin having a branched structure may be mixed with an ordinary non-branched polycarbonate resin in any desired ratio, for use in the invention.

For controlling the molecular weight of the polycarbonate resin for use herein, usable is any of phenol, p-t-butylphenol, p-t-octylphenol, p-cumylphenol, etc.

The polycarbonate resin for use in the invention may be a copolymer having a polycarbonate moiety and a polyorganosiloxane moiety, or a polycarbonate resin containing such a copolymer. It may also be a polyester-polycarbonate resin to be obtained by polymerizing a polycarbonate in the presence of an ester precursor, for example, a difunctional carboxylic acid such as terephthalic acid or its ester-forming derivative. Various types of polycarbonate resins may be mixed, and the mixtures may also be used herein.

In view of its mechanical strength and moldability, the polycarbonate resin for the component (A) in the invention preferably has a viscosity-average molecular weight falling between 10,000 and 100,000, more preferably between 12,000 and 40,000, even more preferably between 14,000 and 30,000. From the viewpoint of environmental protection, it is desirable that the polycarbonate resin does not contain a halogen in its structure.

Next described is the styrenic resin for the component (B) in the invention. It may be a polymer to be obtained by polymerizing a monomer or a monomer mixture that comprises from 20 to 100% by weight of a monovinylic aromatic monomer such as styrene or $\alpha$-methylstyrene, from 0 to 60% by weight of a vinyl cyanide monomer such as acrylonitrile or methacrylonitrile, and from 0 to 50% by weight of any other vinylic comonomer such as maleimide, methyl acrylate or methyl methacrylate capable of copolymerizing with the monomers. Concretely, the polymer includes polystyrene (GPPS), acrylonitrile-styrene copolymer (AS resin), etc.

For the styrenic resin for the component (B), also preferred are rubber-modified styrenic resins. Preferably, they are high-impact styrenic resins of rubber grafted with styrenic monomers. The rubber-modified styrenic resins of the type include, for example, high-impact polystyrene (HIPS) of rubber such as polybutadiene grafted with styrene, ABS resin of polybutadiene grafted with acrylonitrile and styrene, and MBS resin of polybutadiene grafted with methyl methacrylate and styrene. Two or more such rubber-modified styrenic resins may be used herein, as combined. If desired, the rubber-modified styrenic resin may be combined with any other non-modified styrenic resins such as those mentioned above.

The rubber content of the rubber-modified styrenic resin for use herein may fall, for example, between 2 and 50% by weight, preferably between 5 and 30% by weight, more preferably between 5 and 15% by weight. If the rubber content is smaller than 2% by weight, the impact resistance of the resin will be poor; but if larger than 50% by weight, it will cause some problems in that the thermal stability of the resin is lowered, the melt flowability thereof is lowered, and the resin will gel or discolor. Specific examples of the rubber are polybutadiene, acrylate and/or methacrylate-containing rubber polymer, styrene-butadiene-styrene rubber (SBS), styrene-butadiene rubber (SBR), butadiene-acryl rubber, isoprene rubber, isoprene-styrene rubber, isoprene-acryl rubber, ethylene-propylene rubber, etc. Of those, especially preferred is polybutadiene. The polybutadiene for use herein may be any of low-cis polybutadiene (for example, having from 1 to 30 mol % of 1,2-vinyl bonds and from 30 to 42 mol % of 1,4-cis bonds) or high-cis polybutadiene (for example, having at most 20 mol % of 1,2-vinyl bonds and at least 78 mol % of 1,4-cis bonds), and even their mixtures.

The polycarbonate resin composition of the invention comprises a polycarbonate resin and a styrenic resin, in which the styrenic resin is to improve the melt flowability of the resin composition. Regarding the blend ratio of the two resins in the resin composition, the polycarbonate resin for the component (A) accounts for from 30 to 100% by weight, preferably from 50 to 95% by weight, and the styrenic resin for the component (B) accounts for from 0 to 70% by weight, preferably from 5 to 50% by weight. If the amount of the polycarbonate resin for the component (A) is smaller than 30% by weight, the heat resistance and the mechanical strength of the moldings of the resin composition will be poor. On the other hand, if the amount of the styrenic resin for the component (B) is smaller than 5% by weight, the styrenic resin could not satisfactorily exhibit its ability to improve the moldability of the resin composition. For the styrenic resin (B), preferred are rubber-modified styrenic resins such as those mentioned above.

The ratio of the two resins constituting the resin composition may be suitably determined, depending on the molecular weight of the polycarbonate resin, on the type, the molecular weight, the melt index and the rubber content of the styrenic resin, and on the use, the size and the thickness of the moldings to be formed from the resin composition.

In the first aspect of the invention, the polycarbonate resin composition may contain, not comprising the above-mentioned, branched polycarbonate resin, an additive substance having the ability to improve the melt viscosity of polycarbonate resin. The melt viscosity improver includes tabular fillers such as talc, mica, clay, glass flakes, etc.; and short fiber fillers such as glass fibers, carbon fibers, various types of whiskers, etc. Of those, preferred is talc, as having an additional ability to improve the toughness of resin moldings.

The shape of the fillers is not specifically defined. In general, the tabular fillers may have a mean particle size of from 0.2 to 50 $\mu$m, preferably from 0.3 to 20 $\mu$m or so; and the short fiber fillers may have a mean fiber diameter of from 1 to 30 $\mu$m, preferably from 3 to 20 $\mu$m or so, and a mean fiber length of from 5 to 1000 $\mu$M, preferably from 10 to 500 $\mu$m or so. The filler content of the resin composition is not specifically defined, and may fall between 2 and 30 parts by weight, preferably between 3 and 20 parts by weight, relative to 100 parts by weight of the resin composition comprising the components (A) and (B). The filler content may be suitably determined, essentially depending on the type of the polycarbonate resin, the type of the filler, and the size, the percentage of hollowness and the wall thickness of the resin moldings to be produced.

Another example of the melt viscosity improver is a methyl methacrylate polymer having a weight-average molecular weight of at least 1,000,000. Preferably, the methyl methacrylate polymer is a copolymer in which the methyl methacrylate-derived units preferably account for at least 30% by weight of the copolymer and the units derived from other vinylic comonomers capable of copolymerizing with methyl methacrylate account for the remaining part of the copolymer. The vinylic comonomers capable of copolymerizing with methyl methacrylate include, for example, alkyl acrylates such as ethyl acrylate, propyl acrylate, butyl acrylate, etc.; alkyl methacrylates such as ethyl methacrylate, propyl methacrylate, butyl methacrylate, etc.; aromatic vinyl compounds such as styrene, α-methylstyrene, etc.; vinyl cyanides such as acrylonitrile, methacrylonitrile, etc.

More preferably, the copolymer contains at least 50% by weight of methyl methacrylate-derived units, as its ability to improve the appearance of resin moldings is good. The methyl methacrylate copolymer may be prepared by polymerizing methyl methacrylate with, for example, a comonomer of methyl acrylate or butyl acrylate in any known polymerization method of solution polymerization, suspension polymerization or emulsion polymerization in a mode of single-stage or multi-stage polymerization. Especially preferably, the copolymer is prepared through emulsion copolymerization of the monomers in the presence of, for example, a emulsifier of a sodium or potassium dicarboxylate having an alkyl or alkenyl group with from 10 to 24 carbon atoms, as its stability in molding under heat is good.

Preferably, the methyl methacrylate polymer has a weight-average molecular weight of at least 1,000,000, more preferably from 1,500,000 to 5,000,000. If its molecular weight is smaller than 1,000,000, the ability of the polymer to improve the melt viscosity of the resin composition of the invention will be poor. The copolymer has such an extremely high molecular weight. Therefore, after having been mixed and dispersed in the polycarbonate resin composition of the invention, it will act to improve the melt elasticity (rubber elasticity) of the melt of the resin composition, therefore serving as a melt viscosity improver for the resin composition. Some commercial products of the methyl methacrylate polymer are available on the market, including, for example, Mitsubishi Rayon's Metablen P series, concretely, Metablen P-550A, P-551A, P-530A, P531.

In the first aspect of the invention, the polycarbonate resin composition for gas assist injection molding is characterized by its specific non-Newtonian viscoelasticity that indicates the melt viscosity characteristic of the resin composition. The specific non-Newtonian viscoelasticity of the resin composition can be expressed by using a branched polycarbonate resin, or by adding a non-Newtonian improver (that is, a melt viscosity improver) to ordinary polycarbonate resin, or by a combination of these. The means of expression and also the degree of expression may be suitably selected and determined, depending on the size, the percentage of hollowness, the presence or absence of ribs, the wall thickness and the shape of the intended final moldings. Preferably, the amount of the non-Newtonian improver such as the methyl methacrylate polymer falls between 0.3 and 30 parts by weight, more preferably between 0.5 and 20 parts by weight relative to 100 parts by weight of the resin composition comprising a polycarbonate resin and a styrenic resin, but the amount of the improver could not be indiscriminately determined. If, however, the amount of the improver is smaller than 0.3 parts by weight, the ability of the improver will be low; but if larger than 30 parts by weight, the resin melt will not spread easily.

In the first aspect of the invention, the polycarbonate resin for gas assist injection molding comprises (A) from 30 to 100% by weight of a polycarbonate resin and (B) from 0 to 70% by weight of a styrenic resin, of which the melt viscosity ratio, $\eta H/\eta L$, of the melt viscosity thereof, $\eta H$ (Pa·sec), measured at a shear rate of 10 (sec$^{-1}$) at the optimum molding temperature to the melt viscosity thereof, $\eta L$ (Pa·sec), at a shear rate of 1000 (sec$^{-1}$), is at least 5. Preferably, the melt viscosity ratio, $\eta H/\eta L$, falls between 5 and 20. If the melt viscosity ratio, $\eta H/\eta L$, is larger than 20, the resin melt could hardly follow the profile of the mold cavity that expands while the pressure gas is still in the resin melt in the mold cavity.

In the first aspect of the invention, the polycarbonate resin composition for gas assist injection molding comprises the above-mentioned components (A) and (B), and this readily attains the essential object of the invention which is to unify the wall thickness of resin moldings and to form ribs inside resin moldings. For moldings for OA appliances, information and communication appliances and other electric and electronic appliances that are required to have high-level flame retardancy, an additional component (E) of flame retardant may be added to the resin composition.

The flame retardant for the component (E) is not specifically defined, and may be selected from any known ones depending on its object. It includes, for example, phosphorus-containing organic compounds, phosphorus-containing, halogen-free compounds, silicone compounds, halogen-containing compounds, nitrogen-containing compounds, metal hydroxides, red phosphorus, antimony oxide, expansive graphite, etc. Examples of halogen-containing compounds are tetrabromobisphenol A, polycarbonate halides, polycarbonate halide copolymers and their oligomers, decabromodiphenyl ether, (tetrabromobisphenol) epoxy oligomers, polystyrene halides, polyolefin halides, etc. Examples of nitrogen-containing compounds are melamines, alkyl group- or aromatic group-substituted melamines, etc.; and examples of metal hydroxides are magnesium hydroxide, aluminium hydroxide, etc. Halogen-containing flame retardants are more effective than the others. However, they produce harmful gas while molding materials containing them are molded, and will corrode molds, and, in addition, they give harmful substances when moldings containing them are incinerated. Therefore, from the viewpoint of environmental protection and safety, halogen-free flame retardants are preferred.

For halogen-free flame retardants, for example, preferred are halogen-free, phosphorus-containing organic flame retardants such as phosphate compounds having at least one esteric oxygen atom directly bonding to the phosphorus atom therein. Except for such organic phosphorus-containing compounds, also preferred for halogen-free flame retardants are red phosphorus and silicone flame-retardants such as silicone oils and silicone resins. Silicone flame retardants include silicone compounds having a specific structure and containing a reactive group such as an alkoxy group or an epoxy group, and silicone resins having a specific molecular weight in which the number of oxygen atoms differs in the repetitive units (see Japanese Patent Laid-Open Nos. 306265/1994, 336547/1994, 176425/1996, 139964/1998).

Examples of one type of halogen-free phosphate compounds are those of the following formula (1):

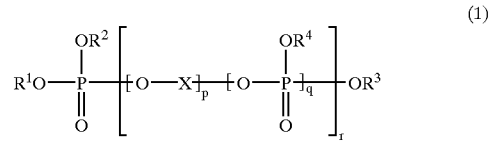

wherein $R^1$, $R^2$, $R^3$ and $R^4$ each independently represent a hydrogen atom or an organic group; X represents a divalent or higher polyvalent organic group; p indicates 0 or 1; q is an integer of 1 or more; and r is an integer of 0 or more.

In formula (1), the organic group may be an alkyl, cycloalkyl or aryl group which may be or may not be substituted. The substituent to be in the substituted organic group includes an alkyl group, an alkoxy group, an aryl group, an aryloxy group, an arylthio group, etc. The substituents may be combined to form, for example, an arylalkoxyalkyl group for the organic group; or they may be bonded to each other via oxygen, nitrogen and/or sulfur atoms to form, for example, an arylsufonylaryl group for the organic group.

In formula (1), the divalent or higher polyvalent group for X may be derived from the above-mentioned organic groups by removing one or more hydrogen atoms bonding to the carbon atoms in the groups. For example, it includes an alkylene group, a phenylene group, a substituted phenylene group, and groups derived from bisphenols of a type of polynuclear phenols. Preferably, the organic group X is derived from bisphenol A, hydroquinone, resorcinol, diphenylmethane, dihydroxydiphenyl, dihydroxynaphthalene, etc.

The halogen-free phosphate compounds for use herein may be monomers, oligomers, polymers and their mixtures. Concretely, they include trimethyl phosphate, triethyl phosphate, tributyl phosphate, trioctyl phosphate, tributoxyethyl phosphate, triphenyl phosphate, tricresyl phosphate, cresyldiphenyl phosphate, octyldiphenyl phosphate, tri(2-ethylhexyl)phosphate, diisopropylphenyl phosphate, trixylenyl phosphate, tris (isopropylphenyl)phosphate, trinaphthyl phosphate, bisphenol A bisphosphate, hydroquinone bisphosphate, resorcinol bisphosphate, resorcinol-diphenyl phosphate, trihydroxybenzene triphosphate, cresyldiphenyl phosphate, and their substituted derivatives and condensates.

Some commercial products of halogen-free phosphate compounds are available on the market for the component (E). Preferred examples of commercially-available halogen-free phosphate compounds are Daihachi Chemical's TPP [triphenyl phosphate], TXP [trixylenyl phosphate], PER [resorcinol(diphenyl phosphate)], PX200 [1,3-phenylene-tetrakis (2,6-dimethylphenyl) phosphate], PX201 [1,4-phenylene-tetrakis(2,6-dimethylphenyl) phosphate], PX202 [4,4'-biphenylene-tetrakis(2,6-dimethylphenyl) phosphate], etc.

The content of the phosphate compound for the component (E) in the resin composition may fall between 1 and 30 parts by weight, preferably between 3 and 20 parts by weight, more preferably between 5 and 15 parts by weight, relative to 100 parts by weight of the resin composition comprising the above-mentioned polycarbonate resin (A) and styrenic resin (B). If the phosphate compound content is smaller than 1 part by weight, the flame retardancy of the resin moldings will be poor; but if larger than 30 parts by weight, the heat resistance and the mechanical strength including the impact resistance of the moldings will be low.

In addition to the flame retardant mentioned above, the polycarbonate resin composition for gas assist injection molding of the invention may further contain a fluoro-olefin resin as an additional component (F), which acts to prevent the resin melt from dropping when the resin moldings are fired. For the resin melt dropping inhibitor, usable are any known fluoro-olefin resins, silicone resins, inorganic whiskers, inorganic fillers, etc. In the invention, preferred are fluoro-olefin resins. The fluoro-olefin resin for the component (F) may be a polymer or copolymer having a fluoroethylene structure. Concretely, it includes difluoroethylene polymers, tetrafluoroethylene polymers, tetrafluoroethylene-hexafluoropropylene copolymers, and copolymers of tetrafluoroethylene and fluorine-free ethylenic monomers. Preferred is polytetrafluoroethylene (PTFE), and its mean molecular weight is preferably at least 500,000, more preferably from 500,000 to 10,000,000. All types of known polytetrafluoroethylenes are usable in the invention.

Of such polytetrafluoroethylenes, those having the ability to form fibrils are more preferred, as they ensure better resin melt dropping inhibition. Polytetrafluoroethylenes (PTFE) having the fibril-forming ability for use in the invention are not specifically defined. For example, those grouped in Type 3 in the ASTM Standards are usable herein. Their examples are Teflon 6-J (from Mitsui-DuPont Fluorochemical), Polyflon D-1, Polyflon F-103, Polyflon F201 (all from Daikin Industry), CDO76 (from Asahi ICI Fluoropolymers), etc.

Except for those grouped in Type 3, also usable herein are Argoflon F5. (from Montefluos), Polyflon MPA, Polyflon FA-100 (both from Daikin Industry), etc. These polytetrafluoroethylenes (PTFE) may be used either singly or as combined. Polytetrafluoroethylenes (PTFE) having the ability to form fibrils such as those mentioned above can be obtained, for example, by polymerizing tetrafluoroethylene in an aqueous solvent in the presence of sodium, potassium or ammonium peroxydisulfide, under a pressure of from 1 to 100 psi at a temperature falling between 0 and 200° C., preferably between 20 and 100° C.

The content of the fluoro-olefin resin for the component (F) to be in the resin composition may fall between 0.05 and 5 parts by weight, preferably between 0.1 and 2 parts by weight, relative to 100 parts by weight of the resin composition comprising the above-mentioned components (A) and (B). If the fluoro-olefin resin content is smaller than 0.05 parts by weight, the ability of the flame-retardant resin composition to prevent the resin melt from dropping will be poor; but even if the fluoro-olefin resin content is larger than 5 parts by weight, it does not produce any better result and it will rather have some negative influences on the impact resistance and the outward appearance of the resin moldings. Accordingly, the fluoro-olefin resin content of the resin composition shall be suitably determined, depending on the desired flame retardancy of the resin moldings that may be ranked as V-0, V-1 or V-2 under UL-94, and on the content of the other components of the resin composition.

The polycarbonate resin composition for gas assist injection molding of the invention may further contain a compound rubber-type graft copolymer for still another component (G) that acts to improve the impact resistance of the resin moldings. The compound rubber-type graft copolymer is prepared by grafting a compound rubber of polyorganosiloxane-polyalkyl (meth) acrylate with vinylic monomers. In this, the polyorganosiloxane component and the polyalkyl (meth)acrylate rubber component are mutually entangled and integrated to form a compound structure of the compound rubber, and the compound rubber is grafted with one or more vinylic monomers. The compound rubber-type graft copolymer is per-se known.

Regarding the ratio of two rubber components constituting the compound rubber, the polyorganopolysiloxane rubber component may account for from 1 to 99% by weight, and the polyalkyl (meth)acrylate component may account for from 1 to 99% by weight. Preferably, the polyorganopolysiloxane rubber components accounts for from 30 to 95% by weight, more preferably from 50 to 90% by weight. The compound rubber is preferably a substantially unseparable compound rubber latex in which the crosslinked polyorganosiloxane rubber structure is mutually entangled with the crosslinked polyalkyl (meth) acrylate rubber structure, and its mean particle size preferably falls between 0.08 and 0.6 $\mu$m.

The vinylic monomers to be grafted on the compound rubber include styrenic compounds such as styrene, $\alpha$-methylstyrene, vinyltoluene, etc.; methacrylates such as methyl methacrylate, 2-ethylhexyl methacrylate, etc.; acrylates such as methyl acrylate, ethyl acrylate, butyl acrylate, etc.; vinyl cyanides such as acrylonitrile, methacrylonitrile, etc. Of those vinylic monomers, preferred is methyl methacrylate. The vinyl monomer content of the compound rubber-type graft copolymer may fall between 5 and 90% by weight relative to from 10 to 95% by weight of the compound rubber component of the copolymer, but preferably between 10 and 70% by weight relative to from 30 to 90% by weight of the compound rubber component. Commercial products of such specific compound rubber-type graft copolymers are available, for example, Metablen S-2001 from Mitsubishi Rayon.

The content of the specific compound rubber-type graft copolymer for the component (G) in the resin composition of the invention may fall between 0.5 and 30 parts by weight, preferably between 1 and 20 parts by weight, more preferably between 2 and 15 parts by weight,, relative to 100 parts by weight of the resin composition comprising the above-mentioned components (A) and (B). If the copolymer content is smaller than 0.5 parts by weight, the effect of the copolymer to improve the impact resistance of the resin moldings will be poor; but if larger than 30 parts by weight, the heat resistance and the toughness of the resin moldings will lower. The copolymer content shall be determined, depending on the necessary properties of the resin moldings and based on the type and the molecular weight of the polycarbonate resin, on the type of the styrenic resin, on the melt index of the resin composition, and on the type of the phosphate compound that serves as a flame retardant.

Further if desired, the polycarbonate resin composition for gas assist injection molding of the invention may contain any other inorganic filler except those mentioned hereinabove, for further increasing the toughness and the mechanical strength of the resin moldings and for further improving the flame retardancy thereof. The additional inorganic filler includes, for example, kaolin, diatomaceous earth, calcium carbonate, calcium sulfate, barium sulfate, etc.

Still if desired, any ordinary additives that are generally used for thermoplastic resins may be added to the polycarbonate resin composition for gas assist injection molding of the invention, along with one or more optional components selected from those mentioned hereinabove. The additional additives are for further improving the moldability of the resin composition and for improving the impact resistance, the outward appearance, the weather resistance and the toughness of the resin moldings. They include, for example, phenolic, phosphorus-containing or sulfur-containing antioxidants, antistatic agents, polyamide-polyether block copolymers (serving as a permanent antistatic agent), benzotriazole-type or benzophenone-type UV absorbents, hindered amine-type light stabilizers (serving as a weather-proofing agent), anti-microbial agents, compatibilizers, colorants (dyes, pigments), etc. The amount of these optional components to be added to the resin composition is not specifically defined, so far as it does not detract from the properties of the polycarbonate resin composition for gas assist injection molding of the invention.

The polycarbonate resin composition for gas assist injection molding of the invention can be obtained by mixing and kneading the above-mentioned component in the specific ratio as above. For mixing and kneading them, any ordinary machines may be used. For example, the components are pre-mixed in a ribbon blender or a drum tumbler, and then kneaded in a Henschel mixer, a Banbury mixer, a single-screw extruder, a double-screw extruder, a multi-screw extruder or a cokneader. The temperature at which the components are kneaded generally falls between 240 and 300° C. Other constituent components than polycarbonate resin and styrenic resin may be previously melted and mixed with polycarbonate resin or styrenic resin or with any other thermoplastic resin to prepare a master batch, and the thus-prepared master batch may be used in producing the resin composition of the invention.

Next described are the second aspect of the invention which is directed to a method for producing blow moldings and the third aspect thereof to the blow moldings produced in the production method. One embodiment of the method for producing blow moldings is a gas assist injection molding method, and this is described herein. The gas assist injection molding method comprises injecting a molten resin mixture into a mold cavity, with a pressure gas being introduced into the resin melt being or having been injected into the mold cavity to thereby form a hollow in the resin melt, and then cooling the resin melt while the gas pressure in the hollow of the resin melt is kept as it is, or that is, while the surface of the thus-blown resin melt is pressed against the surface of the mold. In the method, the resin melt being cooled is not shrunk and ensures good mold profile transferability thereon, and, as a result, the blow moldings thus produced have a good appearance with no shrink marks.

In the gas assist injection molding method, a resin melt may be injected into the mold cavity in any mode of full-shooting to completely fill the mold cavity with the resin melt or short-shooting not to completely fill the mold cavity with the resin melt. In one embodiment of the full-shooting method, the resin melt having completely filled the mold cavity surely receives the mold profile, and a pressure gas is then introduced thereinto whereby a part of the resin melt is expelled from the mold cavity to form a hollow in the thus-blown resin melt.

The pressure gas to be used in the gas assist injection molding method is preferably inert to the melt of polycarbonate resin. Concretely, preferred are inert gases such as nitrogen, helium, argon, etc. In the method, a resin melt may be injected into the mold cavity through a resin injection nozzle or a mold runner, or through a nozzle or pin fitted to surface of the mold cavity. The gas pressure may fall generally between 1 and 30 MPa or so, preferably between 3 and 20 MPa or so; and the time for which the gas pressure is kept as it is may fall between 5 and 60 seconds or so.

For gas assist injection molding, the above-mentioned method is generally employed. However, the method is for producing blow moldings having a relatively low percentage of hollowness, such as those having a percentage of hollowness of at most 50%, and a limit to the reduction in the weight of the blow moldings produced in the method is inevitable. To solve the problem, one may employ a specific method of gas assist injection molding, using a specific mold of which the mold cavity can be reduced and expanded. According to the specific gas assist injection molding method, it is possible to produce blow moldings having a percentage of hollowness of up to about 95% or so. In the method, a resin melt is first injected into a mold cavity not expanded, and then a pressure gas is introduced into the resin melt being or having been injected into the mold cavity. Next, just after the start of the pressure gas introduction into the resin melt or while the pressure gas is introduced thereinto, the mold cavity is expanded to form a hollow in the resin melt. In that condition, the mold cavity is expanded while the pressure gas is present in the resin melt, and the mold is then cooled to solidify the thus-blown resin melt with the pressure gas being still therein. Having been thus cooled, the blown resin melt is solidified to be a hollow article.

When a tabular molding is produced according the specific molding method, its surface is pressed against the surface of the mold owing to the pressure gas introduced thereinto, and therefore can surely receive the fine pattern such as an embossed pattern formed on the surface of the mold. In addition, in the method, it is easy to control, especially to increase the percentage of hollowness of the molding in any desired manner, by controlling the degree of expansion of the mold cavity. Further, the dimensional accuracy in producing moldings in the method is high.

In one preferred embodiment of the specific gas assist injection molding method, a resin melt is injected into the original, non-expanded mold cavity to thereby fill from 80 to 95% or so of the mold cavity, and, in this stage, introducing a pressure gas into the resin melt is started. In that manner, the moldings produced can have a good appearance. For the method in which the cavity volume of the mold used can be reduced and expanded, employable is an injection molding machine equipped with a fixed mold and a movable mold capable of being closed and opened in a known manner and having an additional function of moving forward and backward the movable mold at any desired speed. One embodiment of the injection molding machine of the type is an injection-compression molding machine. In the molding machine, the speed for expanding the mold cavity, or that is, the speed for moving backward the movable mold to thereby enlarge the distance between the facing two molds may fall between 5 and 50 mm/min, and it will be suitably determined depending on the melt viscosity of the resin melt injected into the mold cavity, on the molding temperature and on the temperature of the mold unit. When the movable mold is moved backward in the method, its speed and even the gas pressure in the mold cavity must be well controlled so that the resin melt in the mold cavity does not peel off from the mold surface.

In the specific gas assist injection molding method, the pressure gas can be selectively introduced into the resin melt while the mold cavity is expanded, by specifically designing the position for pressure gas introduction, the pattern and the number of gas introduction nozzles, and the mold temperature profile. In this, therefore, a plurality of isolated hollows can be formed in the blow-molded article. In the method, the part of the resin kept in contact with the mold surface and the part thereof not hollowed are drawn out, following the expanding mold cavity, and a rib structure is thereby formed in the resulting blow-molded article. In particular, when the polycarbonate resin composition of the first aspect of the invention is molded according to the specific gas assist injection molding method, it is extremely easy to form the rib structure in the resulting blow-molded articles owing to the specific melt viscosity profile of the resin composition. This is one significant characteristic of the resin composition. In the blow-molded articles of the resin composition, it is not always necessary that the ribs formed partition the hollow into a plurality of separate hollow sections. In the blow-molded articles, a plurality of ribs may be formed in one, not-partitioned hollow.

The third aspect of the invention is directed to the blow moldings that are produced by molding the polycarbonate resin composition having a specific melt viscosity profile as above, according to the specific gas assist injection molding method. The percentage of hollowness of the blow moldings can be varied within a broad range of from 10 to 95%. The blow moldings of the invention may have reinforcing ribs formed in the hollow. On their surfaces, the blow moldings do not have shrink marks, color spots and weld lines, and are uniformly glossy. The blow moldings have a good appearance. It is possible to transfer any fine pattern such as an embossed pattern on the blow moldings, and the design latitude in producing the blow moldings is broad.

Having the advantages as above, the blow moldings of the third aspect of the invention are favorable to housings and parts of various OA appliances, information appliances, and other electric and electronic appliances for industrial use and household use, such as duplicators, facsimiles, televisions, radios, tape recorders, video decks, personal computers, printers, telephones, information terminals, refrigerators, microwave ovens, etc., and also to automobile parts, etc.

EXAMPLES

The invention is described more concretely with reference to the following Examples and Comparative Examples, which, however, are not whatsoever intended to restrict the scope of the invention.

Examples 1 to 7, and Comparative Examples 1 and 2

The components shown in Table 1 were blended in the ratio indicated therein (the components (A) and (B) are in terms of % by weight, and the other components are in terms of parts by weight relative to 100 parts by weight of the total of (A) and (B)), fed into an extruder (VS40 from Tanabe Plastic Machinery), melted and kneaded therein at 260° C. (but at 300° C. in Example 1), and then pelletized. To all compositions of Examples and Comparative Examples, added were 0.2 parts by weight of Irganox 1076 (from Ciba Specialty Chemicals) and 0.2 parts by weight of Irgafos 168 (from Ciba Speciality Chemicals) both serving as an antioxidant. The resulting pellets were dried at 80° C. for 12 hours. Some of them were analyzed for their resin characteristics; and some others were molded into blow moldings.

The melt viscosity of the pellets was measured at the temperature indicated in Table 1 to determine its shear rate dependency. The data are given in Table 1, along with the melt viscosity ratio, $\eta H/\eta L$. To measure the melt viscosity, used was a capillograph (from Toyo Seiki) having a capillary of 20 mmin length and 1 mm in diameter. The melt viscosity at a shear rate of 10 sec$^{-1}$ and that at 1000 sec$^{-1}$ were measured, from which was obtained the shear rate dependency of the melt viscosity of each sample. Next, the pellets were molded into test pieces in a mode of injection molding, at the molding temperature indicated in Table 1 (that is, the molding temperature is the same as the temperature at which the melt viscosity of the pellets was measured), and the test pieces were tested for the flame retardancy. The results are given in Table 1.

Next, using a gas assist injection-molding machine equipped with a compression unit (from Idemitsu Petrochemical), the pellets were molded into blow moldings. The injection-molding machine used herein is equipped with an spigot-type mold having a box cavity. The volume of the box cavity of the mold can be varied within a range of from 600 mm×300 mm×2 mm to 600 mm×300 mm×10 mm.

The molding method is concretely described. The pellets were melted and kneaded at the predetermined temperature (this is the same as the temperature at which the melt viscosity of the pellets was measured), and the resulting resin melt was injected into the box-type mold cavity having a space of 2 mm (not expanded). The surface temperature of the mold cavity was 60° C. After 95% of the resin melt was injected into the mold cavity, nitrogen gas of 6 MPa was introduced into the resin melt through a pressure gas inlet at the center of the mold. 0.5 seconds after all the resin melt was injected, the mold cavity was expanded at a speed of 20 mm/min. Expanding the cavity was stopped when the cavity space reached 6 mm. In that condition, the mold was cooled, and then opened. The molded article (having a percentage of hollowness of about 65%) was taken out of the mold. This was cut and inspected. Ribs were formed therein, running from the four corners of the article and from the center part of the machine-direction sides toward the center of the article. The wall thickness of the thus-cut article was measured. The data are given in Table 1. The strength of the article was also measured, and the data are in Table 1.

The molding materials used herein, and the methods for testing the molded samples are mentioned below.

Molding Materials (A) Polycarbonate Resin

PC-1: Toughlon A1900 (from Idemitsu Petrochemical).
This is a bisphenol A polycarbonate resin having an MI of 20 g/10 min (at 300° C., under a load of 1.2 kg), and a viscosity-average molecular weight of 19000.

PC-2: Toughlon IB2500 (from Idemitsu Petrochemical).
This is a branched bisphenol A polycarbonate resin (for which the branching agent is 1,1,1-tris(4-hydroxyphenyl)ethane), having an MI of 5 g/10 min (at 300° C., under a load of 1.2 kg), a viscosity-average molecular weight of 25000 (in terms of bisphenol A polycarbonate), and a branching agent content of 0.50%.

(B) Styrenic Resin

HIPS: High-impact polystyrene resin (IDEMITSU-PS-IT44 from Idemitsu Petrochemical).
This is a styrene-grafted polybutadiene having a rubber content of 10% by weight and an MI of 8 g/10 min (at 200° C., under a load of 5 kg).

ABS: Acrylonitrile-butadiene-styrene copolymer (DP-611 from Technopolymer), having an MI of 2 g/10 min (at 200° C., under a load of 5 kg).

(C) Talc

FFR (from Asada Milling), having a mean particle size of 0.7 $\mu$m.

(D) Methyl Methacrylate Copolymer (MMA)

Metablen P-530A (from Mitsubishi Rayon), having a weight-average molecular weight of about 3,000,000.

(E) Flame Retardant (Phosphate)
 P-1: resorcinol bis(diphenyl phosphate).
 This is a phosphate, PFR (from Asahi Denka).
 P-2: triphenyl phosphate, TPP (from Daihachi Chemical).
(F) Fluoro-olefin Resin
 PTFE: CD076 (from Asahi Glass).
(G) Compound Rubber-type Graft Copolymer
 Metablen S2001 (from Mitsubishi Rayon), having a polydimethylsiloxane content of at least 50% by weight.
Test Methods
(1) Melt Index (MI)
 Measured at 260° C. under a load of 2.16 kg, according to JIS K7210. The sample of Example 1 is measured at 300° C. under a load of 1.2 kg.
(2) Wall Thickness of Molded Articles
 Each molded article is halved in the thickness direction, and each half is further cut in the plane direction at intervals of about 50 mm. The wall thickness of each piece is measured.
(3) Strength of Molded Articles
 Supported at two points on its edges, each sample is tested for its mechanical strength with a load being applied thereto.
 ○: Strong, and enough for practical use.
 x: Weak or partly weak, and not enough for practical use.
(4) Flame Retardancy
 Tested according to the UL94 combustion test. Samples tested have a thickness of 1.5 mm.

phosphate compound, can be molded into blow moldings having a uniform wall thickness and having a ribbed structure.

INDUSTRIAL APPLICABILITY

The polycarbonate resin composition for gas assist injection molding of the invention is molded into blow moldings having a relatively high percentage of hollowness. In particular, even when the resin composition is molded into large-size blow moldings, the wall thickness of the moldings is uniform.

In case where the resin composition is molded in a mode of gas assist injection molding in which the mold cavity is expanded while the pressure gas is still in the resin melt therein, it is easy to form reinforcing ribs in the molded articles, and it is also easy to produce lightweight, tough and high-strength blow moldings. Further, the blow moldings produced have no shrink marks, and their appearance is good. The design latitude in molding the resin composition of the invention into blow moldings is broad. The molding method of the invention is suitable to large-sized, thin-walled blow moldings favorable to OA appliances, information and communication appliances, electric and electronic appliances for industrial use and for household use, and automobile parts, and it is expected that the applications of the resin composition of the invention will expand more. In particular, the blow moldings of the invention are favor-

TABLE 1-1

|  |  |  | Example 1 | Example 2 | Example 3 | Comp. Ex. 1 | Example 4 | Example 5 | Example 6 | Example 7 | Comp. Ex. 2 |
|---|---|---|---|---|---|---|---|---|---|---|---|
| Components of Molding Material | (A) | PC-1 | 50 | 85 | 85 | 85 | 85 | 45 | 45 | 75 | 75 |
|  |  | PC-2 | 50 | — | — | — | — | 40 | 40 | — | — |
|  | (B) | HIPS | — | 15 | 15 | 15 | 15 | 15 | 15 | — | — |
|  |  | ABS | — | — | — | — | — | — | — | 25 | 25 |
|  | (C) | Talc | — | 10 | 5 | — | 10 | — | 10 | 10 | — |
|  | (D) | Metablen P-530A | — | — | — | — | — | — | 2 | — | — |
|  | (E) | P-1 | — | — | 10 | 10 | 8 | — | — | 10 | 10 |
|  |  | P-2 | — | — | — | — | — | 8 | 8 | — | — |
|  | (F) | PTFE | — | — | 0.3 | 0.3 | 0.3 | 0.3 | 0.3 | 0.3 | 0.3 |
|  | (G) | Compound Rubber-type Graft Copolymer | — | — | 5 | 5 | 5 | 5 | 5 | — | — |
| Resin Characteristics | (1) | MI | 12 | 7 | 19 | 20 | 19 | 11 | 9 | 15 | 17 |
|  | (2) | Temperature (° C.) for Viscosity Measurement | 280 | 260 | 240 | 240 | 240 | 260 | 260 | 240 | 240 |
|  | (3) | Melt Viscosity ηH | 3500 | 4800 | 1300 | 940 | 1700 | 3800 | 6100 | 1900 | 1100 |
|  | (4) | Melt Viscosity ηL | 620 | 530 | 220 | 200 | 230 | 480 | 580 | 320 | 280 |
|  | (5) | Viscosity Ratio ηH/ηL | 5.6 | 9.1 | 5.9 | 4.7 | 7.4 | 7.9 | 10.5 | 5.9 | 3.9 |
| Evaluation of Molded Articles | (1) | Wall Thickness of Molded Article | uniform | uniform | uniform | not uniform, and unacceptable for practical use | uniform | uniform | uniform | uniform | not uniform, and unacceptable for practical use |
|  | (2) | Strength of Molded Article | ○ | ○ | ○ | x | ○ | ○ | ○ | ○ | x |
|  | (3) | UL-94 | — | — | V-0 | V-0 | V-0 | V-0 | V-0 | V-0 | V-0 |

From the results in Table 1, it is understood that the polycarbonate resin composition for gas assist injection molding of the invention is molded into good blow moldings having a uniform wall thickness. In addition, it is also understood that the resin composition of the invention is suitable to blow moldings having a high percentage of hollowness and having a ribbed structure. Further, it is understood that the polycarbonate resin composition of the invention, even when containing a styrenic resin and a able to doors of duplicators and to housings for CRT monitors and other various appliances.

What is claimed is:

1. A blow molding obtained by a gas assist injection method of a polycarbonate resin composition, which comprises (A) from 30 to 100% by weight of a polycarbonate resin, (B) from 0 to 70% by weight of a styrenic resin, and a filler which is a tabular filler and/or a short fiber filler, wherein said filler is present in an amount between 2 and 30 parts by weight relative to 100 parts by weight of said polycarbonate resin composition comprising (A) and (B), and wherein said polycarbonate resin composition has a melt viscosity ratio, $\eta H/\eta L$, of the melt viscosity thereof, $\eta H$ (Pa·sec), measured at a shear rate of 10 (sec$^{-1}$) at the optimum molding temperature to the melt viscosity thereof, $\eta L$ (Pa·sec), at a shear rate of 1000 (sec$^{-1}$), of at least 5.

2. The blow molding as claimed in claim 1, wherein the polycarbonate resin for the component (A) is at least partly branched.

3. The blow molding as claimed in claim 1, wherein the polycarbonate resin composition contains a flame retardant.

4. The blow molding as claimed in claim 1, for which the mold cavity volume is expanded with the pressure gas being present in the cavity along with the resin composition therein.

5. A method for producing blow moldings, which comprises injecting a melt of the polycarbonate resin composition of claim 1 into a mold cavity not expanded, introducing a pressure gas into the resin melt being or having been injected into the mold cavity, and expanding the mold cavity volume with the pressure gas being still in the resin melt in the mold cavity.

6. A method for producing blow moldings, which comprises injecting a melt of the polycarbonate resin composition of any of claims 1 to 5 into a mold cavity not expanded, introducing a pressure gas into the resin melt being or having been injected into the mold cavity, and expanding the mold cavity volume with the pressure gas being still in the resin melt in the mold cavity.

7. A blow molding produced in the method of claim 6.

* * * * *